J. G. PERRY.
MEAT CUTTER.

No. 30,088.  Patented Sept. 18, 1860.

Witnesses:

Inventor:
John G. Perry

UNITED STATES PATENT OFFICE.

JOHN G. PERRY, OF SOUTH KINGSTON, RHODE ISLAND.

MEAT-CUTTER.

Specification of Letters Patent No. 30,088, dated September 18, 1860.

*To all whom it may concern:*

Be it known that I, JOHN G. PERRY, of South Kingston, in the county of Washington, in the State of Rhode Island, have invented an Improvement in Meat-Cutters; and I do hereby declare that the following is a full and correct description thereof, reference being had to the accompanying drawings, and to the letters of reference marked thereon.

The same letters in all the figures denote the same parts.

Figure 1:
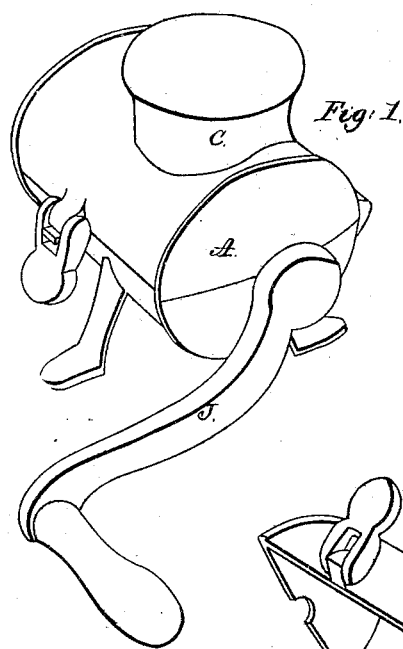
Figure 5:
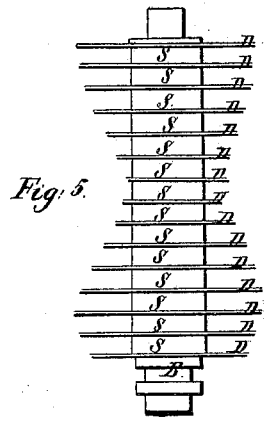
Figure 4:
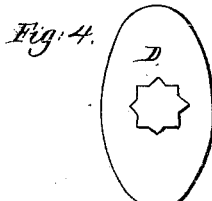
Figure 2:
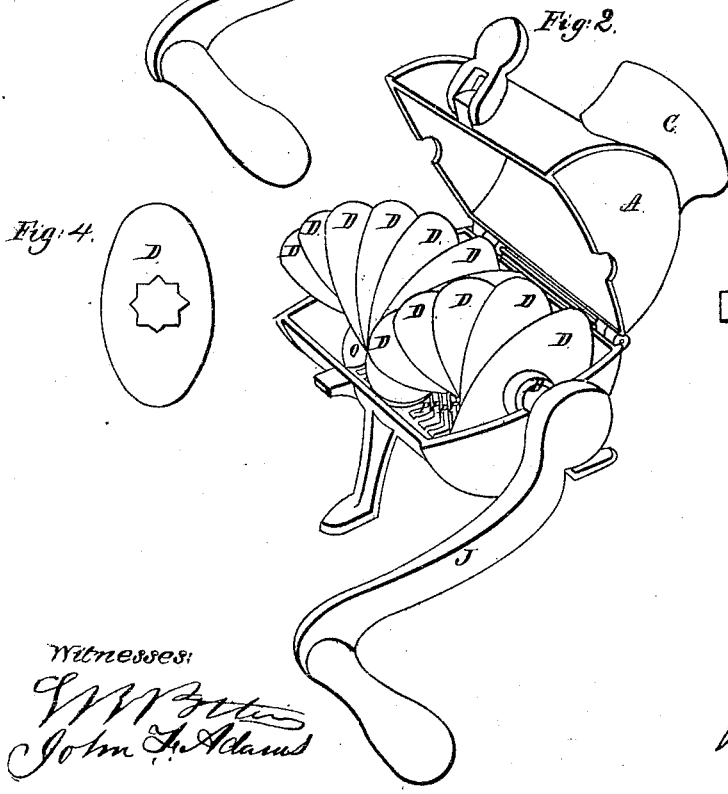
Figure 3:
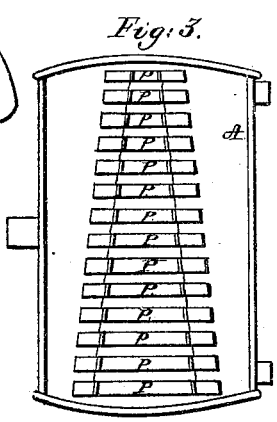

In the drawings, Figure 1, is a perspective view of the machine ready for use. Fig. 2, is a perspective view of the same open so as to show the inside. Fig. 3, is a top view of the lower part of the case, the shaft and knives being removed. Fig. 4, shows one of the knives or cutters. Fig. 5, represents the shaft with the knives and their rings upon it.

This machine consists of a case A, divided into an upper and lower part, and having a shaft B, running through its center, upon which the knives D, D, D, are placed, and which also has a crank J, upon one end to turn it by; this shaft turns in bearings made in the ends of the case.

In the bottom of the case A, are placed a row of studs (see Fig. 3) P, P, P, which may be movable, or cast in one piece with that part of the case, in which they are placed. These studs are made wide at one end of the case and gradually grow narrower toward the other end of the row, as seen in Fig. 3, or so placed in the case that the side of the row against which the meat is to be cut shall be slanting to a line through the center of the knife shaft lengthwise. The tapering or slanting of this row of studs is for the purpose of working the meat as it is minced toward and out of the discharging aperture and may be made on one or both sides in which latter case the machine may be worked both ways. The knives are placed upon the shaft and rings see Fig. 5, are put between them to keep them at a proper distance apart so that they may pass between the studs without hitting them when turned and they are held on to the shaft by a screw or nut at the end, or otherwise, and must be sharpened on both sides when required to work both ways.

To operate the machine; turn the shaft and knives by means of the crank J, and feed the meat into the hopper C, where the knives coming in contact with it, carry it down against the studs P, P, which prevent it from going farther, and hold it while the knives pass through it, until it is cut sufficiently fine, by which time the action of the knives, and the tapering of the row of studs P, will have worked the meat along the case to the discharging orifice O; out of which it will pass into a vessel set to receive it.

Having thus described my improved meat cutter, what I claim as my invention and desire to secure by Letters Patent is—

The combination of a tapering or slanting row of studs with the knives substantially as, and for the purposes herein set forth.

JOHN G. PERRY.

Witnesses:
E. N. POTTER,
JOHN F. ADAMS.